Aug. 21, 1962  A. H. KUGLER  3,050,187
WEIGHING APPARATUS
Filed March 30, 1955  4 Sheets-Sheet 1

ALBERT H. KUGLER,
INVENTOR.

BY Lyon & Lyon
ATTORNEYS

Aug. 21, 1962   A. H. KUGLER   3,050,187
WEIGHING APPARATUS
Filed March 30, 1955   4 Sheets-Sheet 2

ALBERT H. KUGLER,
INVENTOR.

BY Lyon & Lyon
ATTORNEYS

Aug. 21, 1962 A. H. KUGLER 3,050,187
WEIGHING APPARATUS
Filed March 30, 1955 4 Sheets-Sheet 3

ALBERT H. KUGLER,
INVENTOR.

BY Lyon & Lyon
ATTORNEYS

Aug. 21, 1962  A. H. KUGLER  3,050,187
WEIGHING APPARATUS
Filed March 30, 1955  4 Sheets-Sheet 4
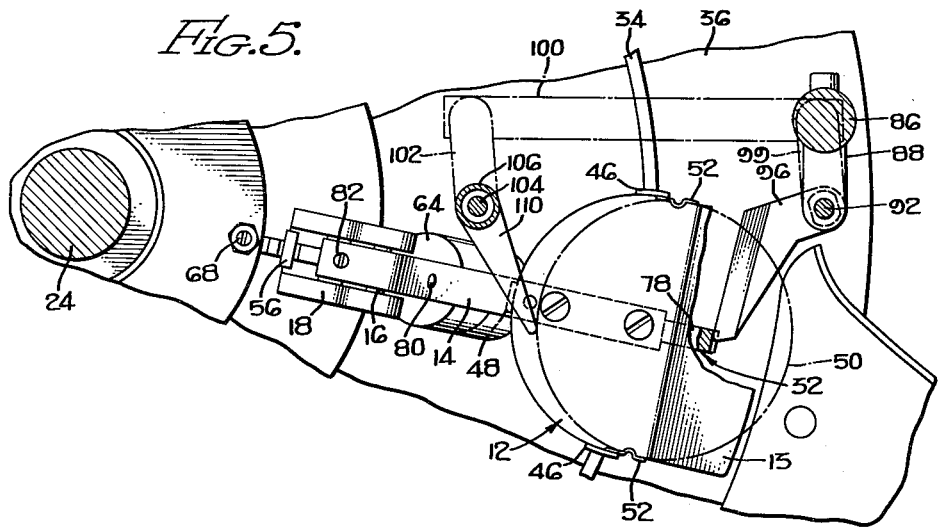
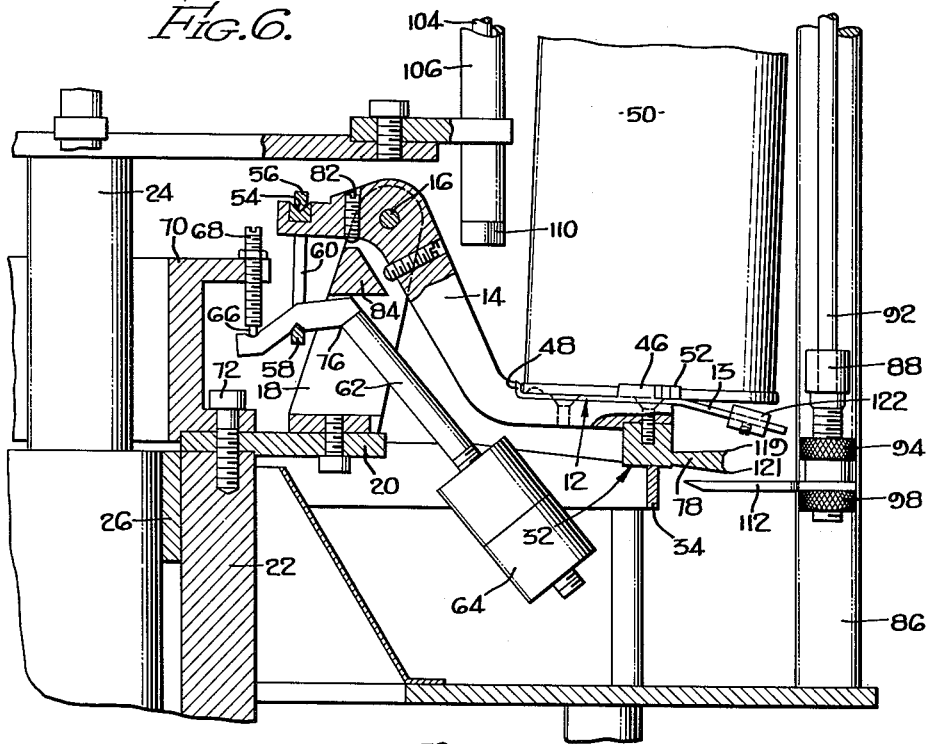
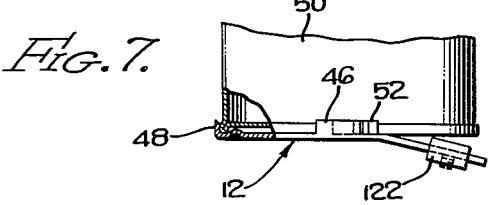
ALBERT H. KUGLER,
INVENTOR.
BY Lyon & Lyon
ATTORNEYS United States Patent Office 3,050,187
Patented Aug. 21, 1962

3,050,187
WEIGHING APPARATUS
Albert H. Kugler, Oakland, Calif., assignor to California Packing Corporation, San Francisco, Calif., a corporation of California
Filed Mar. 30, 1955, Ser. No. 497,949
11 Claims. (Cl. 209—121)

This invention relates to an improved weighing apparatus.

It is an object of this invention to weight containers to ascertain if same have been filled with the proper weight of contents.

It is a further object of this invention to weigh containers and their contents while said containers are moving along a path diverting under and overweight containers from the path.

It is still a further object of this invention to provide a high speed weighing apparatus which will remove from a continuous supply of containers those which are over or underweighted.

It is a further object of this invention to provide such a weighing apparatus which functions in a single operation.

It is a further object of this invention to provide a weighing apparatus which has a high degree of accuracy.

Other objects and advantages will be readily apparent from the following description:

In the drawings:

FIGURE 5 is a section taken along line 5—5 of FIGURE 4.

FIGURE 6 is a section taken along line 6—6 of FIGURE 1.

FIGURE 7 is a fragmentary view of a modified can support plate.

Figure 1:
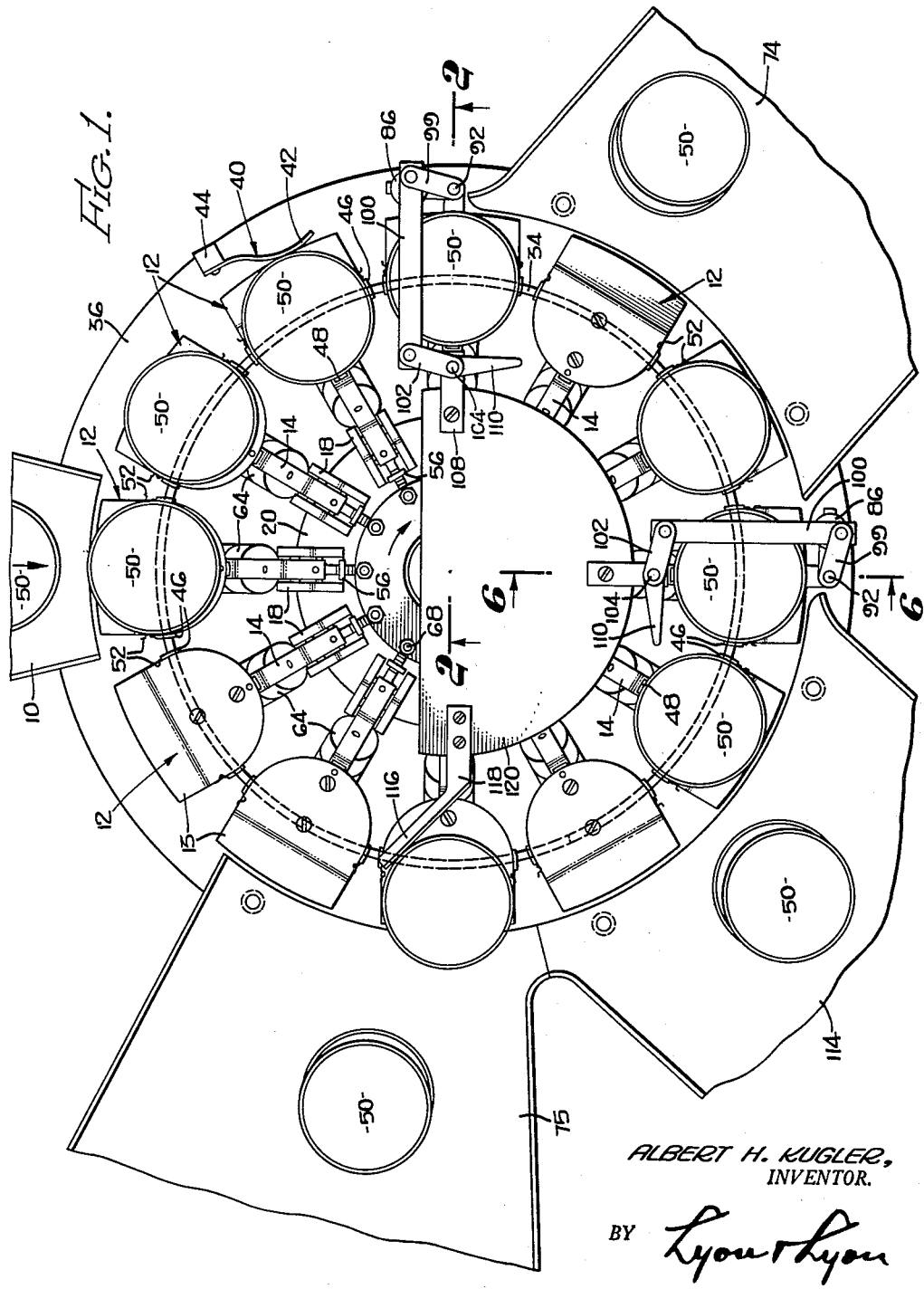
FIGURE 1 is a fragmentary top plan view of a device embodying this invention.

While the drawings illustrate a device particularly adapted to weighing cans it is readily apparent that different containers may be utilized. After a can has been filled with for example fruit or vegetables, it is necessary to weigh same to determine if the proper weight of produce has been put in the can prior to sealing. For this purpose filled cans are advanced in single file from chute 10 onto a can support plate 12. A series of such support plates are provided identical in construction, consequently, only one will be described in detail.

It is to be noted that the outward side of the plate 12 is bent downwardly as at 13 to provide an inclined surface to receive the can 50 from chute 10 and to facilitate ejection. Also the outward side is somewhat flared to be larger than the can.

This can support plate is mounted upon the extremity of arm 14 which is pivotally supported by pin 16 which in turn is supported between two main pivot bearings, each of which is mounted upon an arm 18. The arms 18 are mounted upon plate 20 which is secured to sleeve 22. The sleeve 22 is mounted upon stationary shaft 24 by bearing 26 and is driven by wheel 28 keyed as at 30 to sleeve 22 and also rotatably mounted on shaft 24. The wheel is driven by suitable means not shown, causing the plate 12 to advance from chute 10 towards the discharge chute 74.

To temporarily stabilize the scale the underside of support plates 12 has fixed thereon a cam follower 32 which rests on circular cam 34 which is supported above stationary plate 36 by legs 38 as the support plates are rotated.

The cam 34 prevents downward movement of the follower 32 and hence plate 12 during the travel thereof from chute 10 beyond the can positioning wiper 40. This wiper comprises a spring 42 mounted upon block 44 in turn supported by plate 36.

As a can progresses through chute 10 it is delivered to support plate 12. The plate has a pair of opposed side flanges 46 and a rear flange 48 to engage the can 50. As the sleeve 22 and hence plate 12 is rotated the spring 42 will strike the can and urge same into the proper position. To hold the can against the tendency to move caused by centrifugal force the above mentioned flanges 46 and 48 are positioned slightly outward of the center of the can. In place thereof or in addition thereto a projection 52 may be provided on the plate 12 over which the rim of the can may ride but which will offer a sufficient resistance to counteract centrifugal force. To avoid tipping the can the spring 42 is preferably positioned to engage it at the lower rim thereof.

After the can support plate 12 and hence can 50 pass the can positioning wiper 40 the cam 34 falls away, permitting the arm 14 to pivot downwardly. The cam is so constructed that it falls away at a rate slower than the settling rate of the scale.

The portion of arm 14 beyond pivot pin 16 is provided with a notch 54 receiving knife edge 56. The knife edge 56 is the upper side of a rectangle having an opposed lower knife edge 58 and connecting sides 60.

The lower knife edge supports the balance weight arm 62, which at one extremity carries balance weights 64 and at the other extremity is recessed to receive the steel ball fulcrum 66. The arm 62 is threaded to permit adjustment of the weights 64 and the fulcrum 66 is supported on an adjusting screw 68. The screw 68 is mounted in sleeve 70 which is fixed to and rotates with sleeve 22 by bolt 72 which passes through and secures plate 20 to sleeve 22.

When the cam follower 32 approaches the light can discharge chute 74 the cam 34 gradually permits the follower and hence support plate 12 to descend exerting an upward force on arm 62 tending to raise weights 64. When a state of balance is reached the cam follower floats free of the cam. A state of balance is reached for the reason that as the can support plate 12 and can 50 descend the weights 64 are pivoted about fulcrum 66 upwardly and outwardly with respect to the fulcrum, thereby increasing the effective length of scale arm 62. In this manner a self-balancing scale is formed. Such a self-balancing scale has the characteristic that as weight is applied to the scale arm 14, the effective length of the counter balance arm 62 is increased by virtue of the counterweight moving outwardly on an arcuate path.

The use of such a self-balancing scale insures that the cam follower 32 will leave the cam 34 at a given point for a given weight. The scale is self-dampening and this can be adjusted as for example varying the angle 76 of arm 62. It has been determined that for purposes of weighing objects in the neighborhood of one pound an angle between thirty-two to thirty-seven degrees is most satisfactory. The sensitivity of the scale that is the distance the counter-balance arm moves for a given increment of weight can be varied in many ways for example, the adjustment of screw 68.

Thus the can 50 and support plate 12 will be at a different vertical height when the cam follower 32 leaves cam 34 dependent upon the weight in the can. The gradual fall of the cam and the self-dampening action of the scale limits oscillation of the scale. The cam follower has mounted thereon a weight selector knife bumper 78 which therefore indicates by its vertical position the weight of the can and its contents.

After the cam 34 has been reduced so that the cam follower 32 is held off of same by the self-balancing scale, means are provided to interpret the vertical position of bumper 78 to eject under or overweight cans. However, scale beam or arm 14 is limited in its travel by set screws 80 and 82 which engage stop 84 mounted on arm 18. By adjustment of the screws 80 and 82 these limits can be varied.

Positioned prior to chute 74 into which the light cans are ejected is a light can ejecting mechanism. Mounted on plate 36 is a post 86, which has two spaced brackets 88 and 90 formed thereon. Each bracket has a hole therein through which operating rod 92 passes. At its lower end rod 92 is threaded receiving the nut 94 which is adjustable thereon. A weight selector knife 96 is then keyed to and slidably fitted upon rod 92 followed by threaded nut 98. It is apparent that by adjusting the nuts 94 and 98 that the selector knife can be raised or lowered whereby the bumper 78 must occupy a different position before it will engage knife 96.

When the bumper 78 engages knife 96, that is, when the weight of the can 50 is less than a predetermined amount so that a condition of balance is reached and the cam follower floats free of the cam at a point where arm 14 and cam follower 32 are still in a relatively high position, the knife 96 and hence rod 92 to which it is keyed, is caused to rotate as the cam support plate 12 continues along its rotary path.

Figure 3:
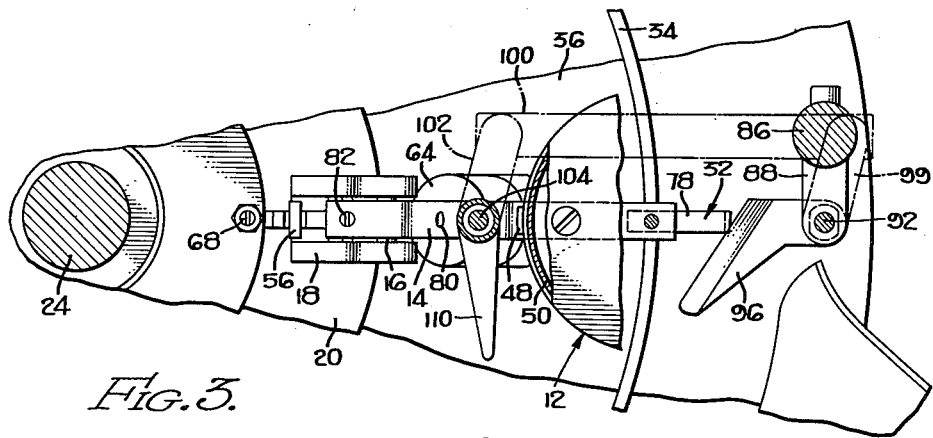
FIGURE 3 is a section taken along line 3—3 of FIGURE 2.
Figure 4:
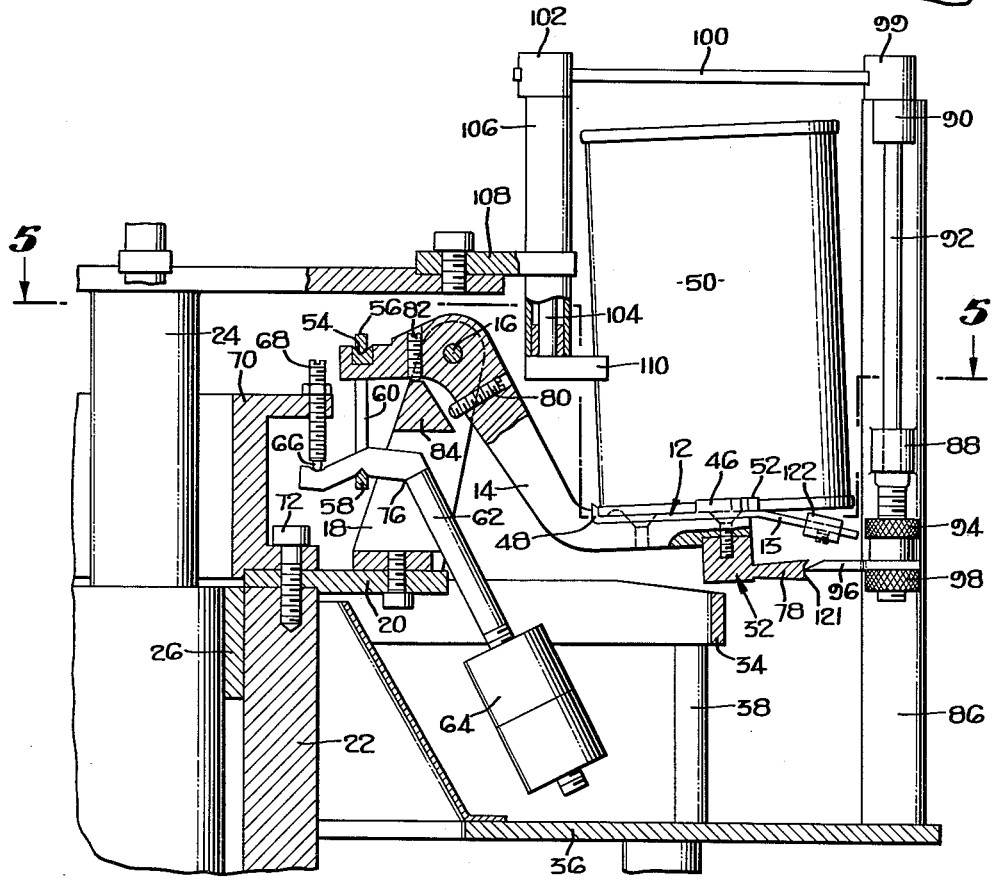
FIGURE 4 is a view similar to FIGURE 2 showing the weighing of an underweight can.

Fixed upon the upper extremity of rod 92 is a link 99 which is slotted to receive the extremity of arm 100, which is pivotally mounted therein by a suitable pin. When rod 92 is rotated so is link 99, which in turn moves arm 100 to the left in FIGURES 3 and 4. At its opposite extremity arm 100 is pivotally mounted upon link 102 in the same manner as it is connected to link 99. The link 102 is mounted upon the upper extremity of rod 104 which is rotatably housed in sleeve 106. The sleeve 106 is in turn mounted upon plate 108 suitably mounted upon fixed shaft 24. At the bottom of rod 104 the light weight can ejector 110 is secured so that rotation of said rod moves the can ejector counterclockwise in FIGURE 1, into the path of can 50 held on rotating support plate 12 and removes same from the plate onto the discharge chute 74.

Figure 2:
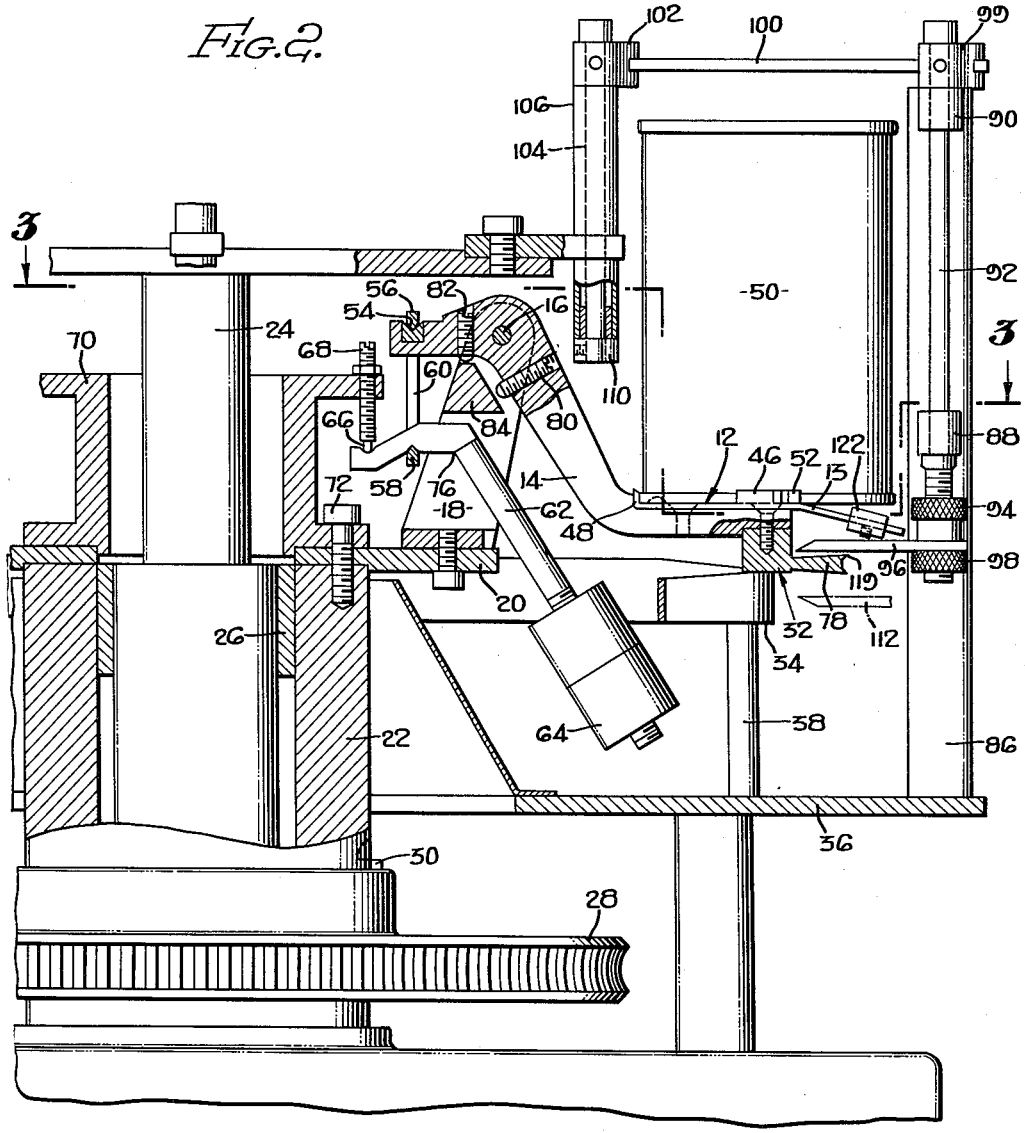
FIGURE 2 is a section taken along line 2—2 of FIGURE 1.
Figure 8:
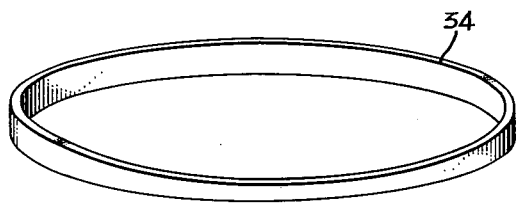
FIGURE 8 is a perspective view of a circular cam used in the present invention.

The functioning of the heavy or overweight ejecting mechanism is identical. The ejector knife 112 is illustrated in phantom in FIGURE 2. This knife is, of course, lower than the light weight selector knife 96 because a heavier can will seek a lower level before the self-balancing scale will reach an equilibrium. Since the remaining details of the overweight ejector mechanism are identical to the underweight ejector mechanism, it will not be described in detail.

Thus the overweight cans are urged by an overweight can ejector 110 into chute 114. The cans which pass both the light and heavyweight ejector mechanisms are within the tolerable weight range selected by the positioning of knives 96 and 112. A permanent ejector 116 is mounted over the correct weight discharge chute 75 upon bracket 118 mounted upon stationary plate 120. Thus, as the can support plates 12 rotate they carry cans 50 into contact with ejector 116 which removes same from the plate and urges same onto the discharge chute 75.

Referring specifically to FIGURES 5 and 6, the shape of the ejector knives 96 or 112 and bumper 78 is illustrated. To afford greater accuracy the lightweight selector knife 96 is beveled on the upper side while the heavyweight selector knife is beveled on the under side. The bevels may be substantially fifteen degrees for best results. When the bumper engages one of the knives an additional downward thrust is applied to the arm 14 acting as the addition of more weight and forcing the self-balancing scale to a lower level. The movement of arm 14 and hence bumper 78 is arcuate and there is a tendency for the bumper to slip off the knife. To counteract this the bumper is provided with a pair of knife edges 119 and 121. The angle of the knife edges is governed by two factors, first, it must be sufficiently large to make the edge sturdy and second, the angle must be smaller than the arcuate travel of the knife edge of bumper 78 to prevent disengagement.

Under certain circumstances where the weight of a can is just slightly greater than the lightweight which would be ejected or slightly less than the heavyweight which would be ejected the upper or lower surface bumper 78 will ride upon the ejector knives. The friction would cause an erroneous ejection. To reduce this the bumper is tapered (see FIG. 6), with the upper and lower surfaces inclined toward one another at for example, a two-degree angle.

To adjust the device for handling different size cans several alternatives are possible. First, to change the weights 64, or second, a shoe such as 122 (FIGURE 7) may be fitted on plate 12, if extra light cans are to be weighed.

In operation cans are fed by any suitable means through chute 10 onto the can support plate 12. At this time the cam follower 32 rests on cam 34 to support plate 12 and lock same upon receipt of a can 50. The can support plate is rotated and the wiper 40 engages the lower rim of the can seating same on plate 12. As the plate 12 continues its movement the cam 34 gradually tapers at a rate slower than the settling rate of the scale, permitting plate 12 to follow cam 34 down. The plate 12 descends until the cam follower 32 floats free of the cam, that is, where a state of balance has been reached in the self-balancing scale. The bumper 78 indicates the position of plate 12 and hence the weight of can 50. As the can plate 12 further rotates it passes the lightweight ejector. If the can is below a predetermined weight the bumper 78 is sufficiently high to strike knife 96 which operates the ejector 110 to move the can off plate 12 into discharge chute 74. If the can is above this predetermined weight the bumper 78 is below knife 96 and the can rotates by the lightweight ejector. If the can is over a predetermined weight the bumper 78 is sufficiently low to engage the overweight ejector knife 112 which operates the overweight ejector to discharge the can out chute 114. If the bumper 78 passes between knives 96 and 112 the weight of the can is within the tolerances permissible and is carried into contact with the stationary ejector 116, which moves the can onto discharge chute 75. Just prior to ejection the cam 34 begins to rise and comes into contact with cam follower 32 stabilizing the scale. The support plate continuing its rotary path receives another can from chute 10.

In the embodiment illustrated twelve plates are utilized providing a continuously operating machine which can handle a couple of hundred cans a minute.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:
1. A device for weighing containers comprising: a container supporting plate, means for advancing said plate along a path, a cam supporting said plate during a portion of its travel along said path, a self-balancing scale connected to said plate weighing the contents of a container on said plate when same is released by said cam, and means for ejecting from said path improperly weighted containers said cam having a rate of descent slower than the rate of descent of said scale.

2. A device for weighing containers comprising: means for advancing a container along a path, cam means supporting said container during a portion of its travel along said path, self-balancing scale means supporting said container during the remainder of its travel along said path, and means for ejecting from said scale means improperly weighted containers said cam having a rate of descent slower than the rate of descent of said scale.

3. A device for weighing containers comprising: a container supporting plate, means for centering said container on said plate, means for advancing said plate along a path, a cam supporting said plate during a portion of its travel along said path, a self-balancing scale connected to said plate weighing the contents of a container on said plate when same is released by said cam, and means for ejecting from said path improperly weighted containers said cam having a rate of descent slower than the rate of descent of said scale.

4. A device for weighing containers comprising: a container supporting plate, means for centering said container on said plate, means for releasably holding said container in said centered position, means for advancing said plate along a path, a cam supporting said plate during a portion of its travel along said path, a self-balancing scale connected to said plate weighing the contents of a container on said plate when same is released by said cam, and means for ejecting from said path improperly weighted containers said cam having a rate of descent slower than the rate of descent of said scale.

5. A device for weighing containers comprising: means for advancing a container along a path, cam means supporting said container during a portion of its travel along said path, self-balancing scale means supporting said container during the remainder of its travel along said path, and means positioned along said path for determining the position of said container in said scale means for ejecting improperly weighted containers said cam having a rate of descent slower than the rate of descent of said scale.

6. A device for weighing containers comprising: a supporting plate, means supplying a container to said plate, means progressing said container along a path, means along said path centering said container on said plate, a cam supporting said support plate until after same has passed said centering means, self-balancing scale means supporting said plate after release thereof by said cam, means positioned along said path for determining the position of said container while supported by said scale means permitting passage of a container weighing between predetermined limits said cam having a rate of descent slower than the rate of descent of said scale.

7. A device for weighing containers comprising: a supporting plate, means supplying a container to said plate, means progressing said container along a path, means along said path centering said container on said plate, a cam supporting said support plate until after same has passed said centering means, self-balancing scale means supporting said plate after release thereof by said cam, and ejector means positioned along said path for ejecting a container from said plate which fails to depress the scale beam of said self-balancing scale means below a predetermined level said cam having a rate of descent slower than the rate of descent of said scale.

8. A device for weighing containers comprising: a supporting plate, means supplying a container to said plate, means progressing said container along a path, means along said path centering said container on said plate, a cam supporting said support plate until after same has passed said centering means, self-balancing scale means supporting said plate after release thereof by said cam, and ejector means positioned along said path for ejecting a container from said plate which depresses the scale beam of said self-balancing scale means below a predetermined level said cam having a rate of descent slower than the rate of descent of said scale.

9. A device for weighing containers comprising: a supporting plate, means supplying a container to said plate, means progressing said container along a path, means along said path centering said container on said plate, a cam supporting said support plate until after same has passed said centering means, self-balancing scale means supporting said plate after release thereof by said cam, and ejector means positioned along said path for ejecting a container from said plate which fails to depress the scale beam of said self-balancing scale means below a predetermined level, and ejector means positioned along said path for ejecting a container from said plate which depresses the scale beam of said self-balancing scale means below a predetermined level said cam having a rate of descent slower than the rate of descent of said scale.

10. A device for weighing containers comprising: a supporting plate, means supplying a container to said plate means progressing said container along a path, means along said path centering said container on said plate, a cam supporting said support plate until after same has passed said centering means, self-balancing scale means supporting said plate after release thereof by said cam, and ejector means positioned along said path for ejecting a container from said plate which fails to depress the scale beam of said self-balancing scale means below a predetermined level, ejector means positioned along said path for ejecting a container from said plate which depresses the scale beam of said self-balancing scale means below a predetermined level, and further ejector means for removing from said path a container not previously ejected said cam having a rate of descent slower than the rate of descent of said scale.

11. A device for weighing containers comprising: a supporting plate, means supplying a container to said plate, means progressing said container along a path, means along said path centering said container on said plate, a cam supporting said support plate until after same has passed said centering means, self-balancing scale means supporting said plate after release thereof by said cam, and stationary means positioned along said path for determining the position of said container while supported by said scale means permitting passage of a container weighing between predetermined limits said cam having a rate of descent slower than the rate of descent of said scale.

References Cited in the file of this patent

UNITED STATES PATENTS

| | | |
|---|---|---|
| 1,199,184 | Hubman | Sept. 26, 1916 |
| 1,315,720 | Gwinn | Sept. 9, 1919 |
| 1,355,999 | Nelson | Oct. 19, 1920 |
| 2,086,103 | Thompson | July 6, 1937 |
| 2,138,475 | Hilton | Nov. 29, 1938 |

FOREIGN PATENTS

| | | |
|---|---|---|
| 421,034 | Great Britain | Dec. 12, 1934 |